Sept. 23, 1924.

S. BARDY

RECTIFYING LENS

Filed June 5, 1922

WITNESS:

INVENTOR
Samuel Bardy
BY
ATTORNEY.

Sept. 23, 1924.

S. BARDY 1,509,629

RECTIFYING LENS

Filed June 5, 1922    2 Sheets-Sheet 2

WITNESS:

INVENTOR
Samuel Bardy
BY
Frank S. Busser
ATTORNEY.

Patented Sept. 23, 1924.

1,509,629

UNITED STATES PATENT OFFICE.

SAMUEL BARDY, OF PHILADELPHIA, PENNSYLVANIA, ASSIGNOR TO BARDY MOTION PICTURE MACHINE COMPANY, OF PHILADELPHIA, PENNSYLVANIA, A CORPORATION OF DELAWARE.

RECTIFYING LENS.

Application filed June 5, 1922. Serial No. 566,174.

*To all whom it may concern:*

Be it known that I, SAMUEL BARDY, a citizen of the United States, residing at Philadelphia, county of Philadelphia, and State of Pennsylvania, have invented a new and useful Improvement in Rectifying Lenses, of which the following is a full, clear, and exact description, reference being had to the accompanying drawings, which form a part of this specification.

This invention relates to an improvement in rectifying or compensating lenses such as used in systems for rectifying the movement of films in motion picture machines in which the film is moved in a continuous manner at a constant speed, such as that shown in my Patent No. 1,316,669, issued September 23, 1919, and applications Serial No. 450,575, filed March 8, 1921; Serial No. 486,070, filed July 20, 1921; Serial No. 507,340, filed October 12, 1921; and Serial No. 566,173, filed June 5, 1922.

The compensating or rectifying lenses illustrated in the above patent were formed of a plurality of separate units mounted on an annular support.

In two such machines which I constructed and tested, there were four rectifying lenses, each of which comprised a plurality of units.

This multiple unit rectifying lens system has been fully tested out with other elements of a motion picture machine, the film and rectifying lenses were moved in a continuous manner, and the pictures projected thereby were perfect.

In all such systems known prior to this invention in which the compensating or rectifying lenses were provided with an effective aperture multiple times greater than the beam of light from the fixed objective lens system, the rectifying lenses were built up of a number of separate units mounted on the annular support, and as each unit must be adjusted relative to all the other units to project a perfect image, considerable labor and patience were required to construct such a system.

One of the objects of this invention is to provide complete lenses of arcuate form which are ground to be positioned about the axis of the lens support. This forming of these lenses from a single piece of glass not only materially reduces the cost of grinding, but greatly reduces the cost of assembling.

A further object of my invention is to reduce the amount of glass in such lenses to a minimum not only to reduce the weight, but to more evenly distribute the weight around the axis of rotation, as well as to avoid variations in the strength of light passing through different portions of the lenses.

A further object of my invention is to provide means on the lenses and support whereby the lenses may be accurately positioned on the support and thereby eliminate the necessity of adjustment at least angularly and radially.

My invention in the preferred form comprises a rectifying lens element of arcuate form composed of a plurality of integral units, and in which each lens element preferably comprises a complete rectifying lens, that is: one whose integral units comprise the entire series of units of a complete lens.

My invention also comprises an annular multiple lens composed of a series of lens elements (each preferably a complete lens), each of which is composed of a plurality (preferably a complete series) of integral units.

My invention further comprises an integral rectifying lens element of arcuate form having one face concentric with the center of the axis of rotation and the other face composed of a plurality of sections, each of which forms a continuation of the others and at different angular relation to the surface concentric to the axis of rotation.

The precise nature of my invention will be best understood by reference to the drawings, which will now be described, it being understood, however, that various changes may be made without departing from the spirit and scope of my invention as defined in the appended claims.

Figure 1:
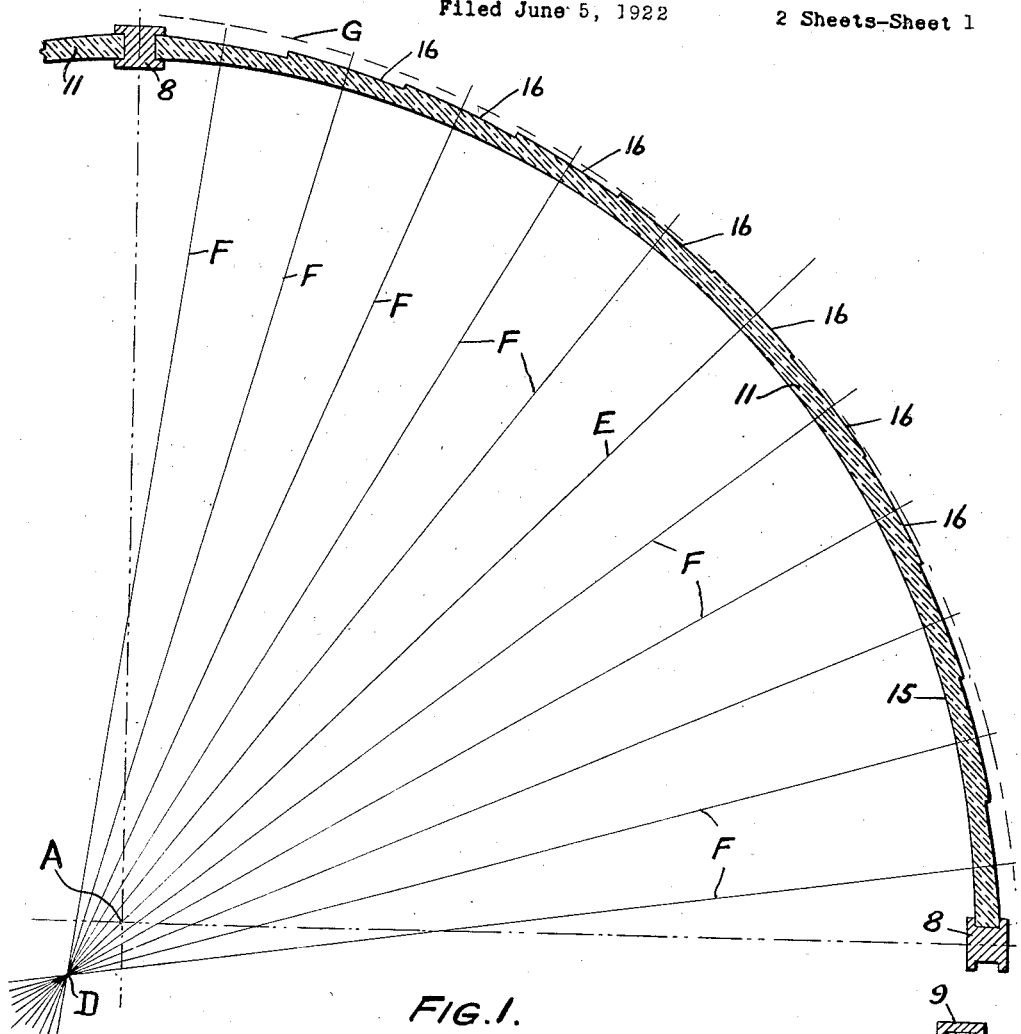
Fig. 1 is a vertical sectional view of a portion of one form of lens made in accordance with my invention.

In the form shown, the drum or lens support comprises a hub 5 to which is secured a disk 6. Secured to the disk 6 is ring 7 and four cross bars 8. Secured to the outer ends of the four cross bars is a grooved ring 9. The disk 6 is provided with a lateral flange 10 at the periphery thereof, which is continuous with the exception of the four portions which may be cut away for the reception of the cross bars 8.

The various members of the drum are fixedly screwed to each other or secured in any other desired manner. Supported in grooves in the sides of the cross bars 8, the groove in the ring 9 and the groove formed by flange 10 and ring 7 are four lenses 11, each of which comprises eleven units.

Each lens is provided with a radial flange 12 at one edge, which is seated in an arcuate groove formed by the disk 6 and ring 7 for positioning and clamping the flange, and 14 designates cement or dope for filling the spaces between the lenses and the outer supporting flange on the ring 9 and the flange 10.

Each lens or lens element 11 in the form shown constitutes a complete lens for rectifying the movement of one picture section on the film, and as there are four such elements mounted in the drum the movement of four successive picture sections of a continuously moving film will be rectified for each revolution of the drum in a manner clearly set forth in various of my copending applications for United States patent.

These lenses or lens elements are of meniscus shape and produce the same rectifying result as would be produced by such lenses if the inner and outer surfaces were continuous and unbroken.

Figure 2:
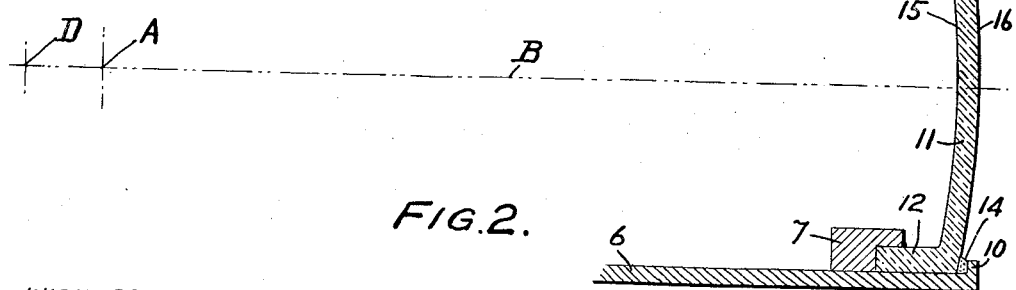
Fig. 2 is a sectional view through the center of the central unit of a lens element.
Figure 3:
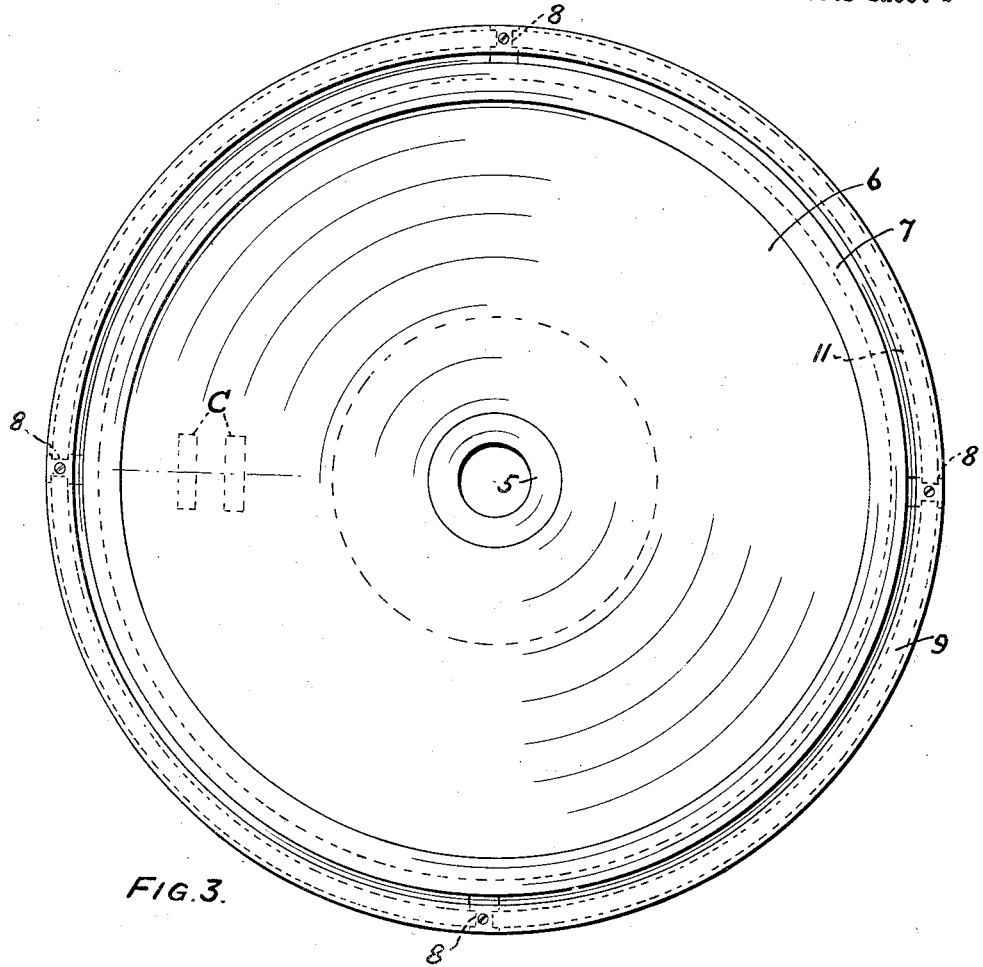
Fig. 3 is a face view of a rectifying drum containing four lenses.
Figure 4:
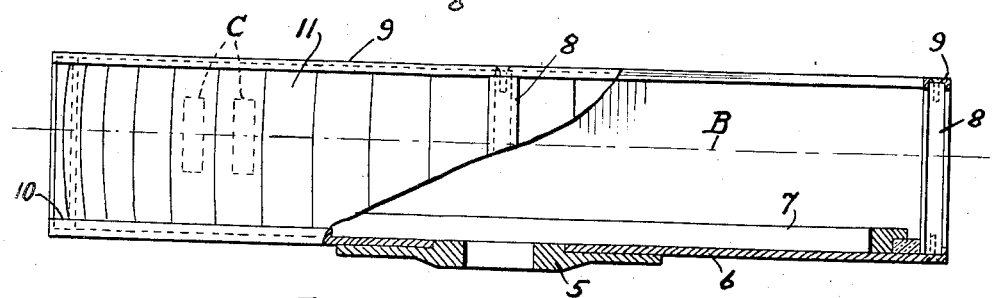
Fig. 4 is a plan view, partially in section, of the drum shown in Fig. 3.

In the specific form shown, the inner surface 15 of each lens is of a shorter radius than the radii of the outer spherical surfaces 16 of the different units of each lens or element. The centers of all of these spherical surfaces are in a common plane perpendicular to the axis A of the lens drum. This plane is indicated by lines B in Figs. 2 and 4. The center of the objective lens system C indicated diagrammatically in Figs. 3 and 4 is also in this same plane, as clearly indicated in Fig. 4.

The inner surface 15 is concentric with a point at the intersection of the axis A and the plane B. The outer surface 16 of the central unit is concentric with a point D on the plane B on a radial line E extending through the center of the unit and the axis A. The outer spherical surfaces 16 of the different units are all substantially of the same radius, but as said surfaces are stepped relative to each other the center of the surface of each unit is at a different position on the plane B. I preferably grind these surfaces 16 of the different units with relation to the inner surface 15, so as to provide substantially the same volume of glass in each unit, and to obtain this result I grind the surfaces of the different units on each side of the central unit so as to be concentric with points located as illustrated in Fig. 1. F are radial lines similar to line E, which extend through the center of the various units at the sides of the central unit, and which lines extend through the center D. The thickness of glass of each unit on the lines F is substantially the same as the thickness of glass of the central unit on the line E. The surfaces 16 of these units at the sides of the central unit are concentric with points on their respective lines F, which points are located on such lines at a distance from the surface 16 which is equal to the distance from point D to the surface 16 of the central unit.

By thus grinding the lens units, I am enabled to maintain the thickness of glass in all of the units substantially equal. This not only equally distributes the weight of the lens elements, but also maintains the glass substantially the same thickness throughout what might be termed the length of the lens.

If these lenses were provided with continuous inner and outer surfaces concentric with points A and D, the outer surface would be a continuation of the outer surface of the central unit and concentric with point D, as indicated by the dotted line G. It will, therefore, be seen that the thickness of the glass in the stepped form decreases from the center to the ends from what it would be if the surfaces were continuous.

As before stated, the curvature of the outer surfaces 16 of the different units are substantially equal, only deviating therefrom to a slight degree, due to correction of the inscribed angles to correct for the reduction of the thickness of glass.

The thickness of glass in meniscus lenses having continuous surfaces of large radii varies considerably from the center to the edges thereof. This is objectionable when such lenses are used in motion picture machines, having continuously moving films, as considerably more light would pass through the center of the lens when in the path of the light rays from the objective lens system than would pass through the end portions of the lenses where such portions traverse the said light rays. This variation of light is overcome by stepping the lenses as illustrated, and the greater the number of steps, the less the variations in light.

The lenses shown may be made by first molding the blanks to form, but somewhat larger than the finished lenses, so as to provide finish on all faces or surfaces.

The outer and annular faces of the flange 12 are then ground to true surfaces to provide holding fixture seating surfaces.

The inner face of the flange 12 may then be ground parallel to the outer surface after which the inner surface 15 is ground from its center, or both these surfaces may be ground simultaneously.

The other surfaces 16 are then ground successively, and as the various light ray effective surfaces may be ground while the lenses are supported from the same surfaces, the lenses will all be ground to a standard so as to be interchangeable.

If desired, the outer surfaces may be concentric to the axis of the drum and the inner surface or surfaces of the different units eccentric thereto.

The advantages of my invention result from the provision of a meniscus shaped rectifying lens element having one of its surfaces struck from a center in the plane of the axis about which the element is to be rotated. Further, from the provision of such elements in which the surface opposite the surface struck from the axis of rotation are stepped to provide units having substantially the same light refracting power. Further, from the provision of such a lens element forming a complete rectifying lens having a plurality of units of different angles merging into each other and in which the cross-sectional area of the glass in all the units is substantially the same to distribute the weight substantially equally around the lens support.

Having now fully described my invention, what I claim and desire to protect by Letters Patent is:

1. A lens for rectifying the movement of a continuously moving film of a motion picture machine, comprising a lens formed of one piece of glass and arranged to be continuously rotated across the axis of an objective lens system, one of the surfaces of the lens being of spherical form and whose center is on the axis of rotation and in the plane of the axis of the objective lens system and the other surface of which is composed of a number of sections of spheres, each having a center different from the centers of all the other spheres, all of said centers being in the plane of the axis of the objective lens system.

2. A rectifying lens system for rectifying the movement of a film in a motion picture machine to produce a stationary image, comprising an annular lens support arranged to be rotated about an axis, a plurality of arcuate lenses mounted therein, each lens comprising a plurality of units, the inner surface of each unit being of spherical form whose center is on the axis of the support while the outer surface of each unit is also substantially spherical but of greater diameter, the center of each unit being at a different position with relation to the center of the inner surface and of greater radii than the radius of the inner surface.

3. A rectifying lens system for rectifying the movement of a film in a motion picture machine to produce a stationary image, comprising an annular lens support arranged to be rotated about an axis, a plurality of arcuate lenses mounted therein, each lens comprising a plurality of units, the inner surface of each unit being of spherical form whose center is on the axis of the support while the outer surface of each unit is also spherical but of greater diameter, the center of each unit being at a different position with relation to the center of the inner surface and of greater radii than the radius of the inner surface, the cross-sectional area of each unit being substantially the same.

4. A lens element adapted to be rotated across the axis of an objective lens system for rectifying the movement of a film in a motion picture projecting machine, said element being formed of a single piece of glass and having a plurality of units, the angle of each unit gradually varying from one end to the other in the direction of rotation, the inner surfaces of the units being of spherical form whose center is on the axis of rotation of the element, the outer surfaces of each of the units being also spherical and of greater radii than the inner surface, the radii of the outer surfaces being substantially equal, while the centers thereof are all in the same plane as the plane of the center of inner surface, said plane being normal to the plane of the axis of rotation, each center being in a different position in said plane.

In testimony of which invention, I have hereunto set my hand, at Philadelphia, Pa., on this 13th day of May, 1922.

SAMUEL BARDY.